May 7, 1946.  J. W. RIDGWAY  2,399,826
DIFFUSER
Filed Dec. 24, 1942
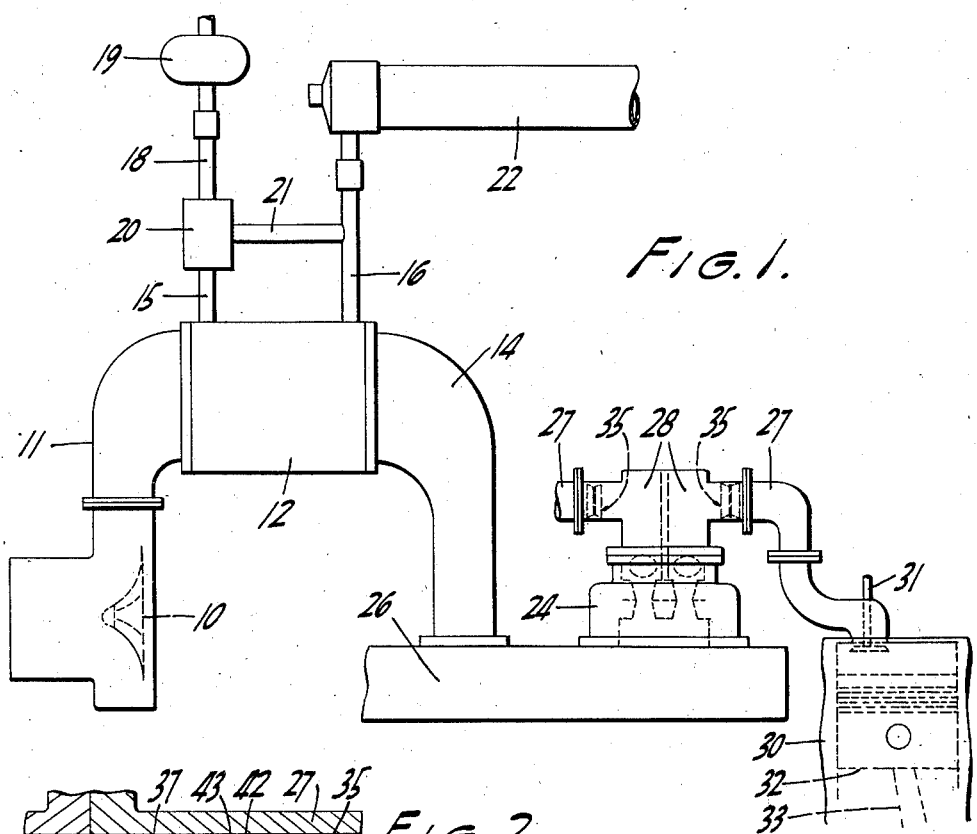
Fig. 1.
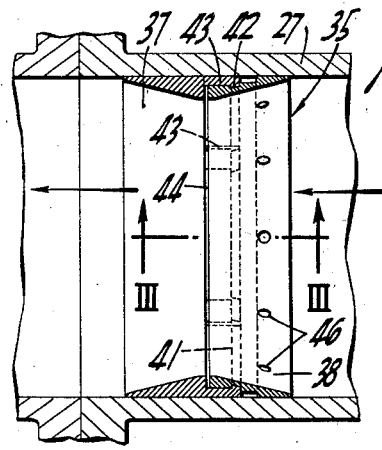
Fig. 2.
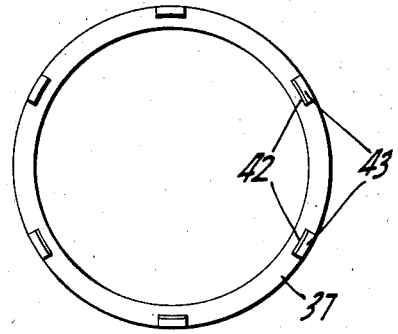
Fig. 3.
Fig. 4.
INVENTOR
JOSEPH W. RIDGWAY
BY
Bean, Brooks, Buckley & Bean
ATTORNEYS Patented May 7, 1946

2,399,826

UNITED STATES PATENT OFFICE 2,399,826

DIFFUSER

Joseph W. Ridgway, Detroit, Mich., assignor to Sterling Engine Company, Buffalo, N. Y.

Application December 24, 1942, Serial No. 470,115

8 Claims. (Cl. 48—180)

This invention relates to improvements in the delivery and distribution of fuel to internal combustion engines.

In engines of high horsepower-per-pound output supercharging or compression of the air supply is resorted to. When air, delivered to such an engine, is compressed, its temperature increases and, ordinarily, a relatively dry mixture of air and gas is delivered to the engine cylinders. However, pressures being equal, the temperature of the gas is an inverse function of its density and the latter in turn controls the effective total of gasoline-air mixture delivered to the engine cylinders.

To render the fuel mixture more dense in the case of supercharged engines, the present invention aims, among other things, to provide heat exchange means between the air compressor and the engine for removing a substantial part of the heat of compression and accordingly densify the air. However, particularly in the case of liquid cooled engines, this is not a satisfactory procedure without doing something more, since the optimum air-gas ratios in such cases bring about a relatively wet mixture which tends to condense on the walls of manifolds or other conduits conveying such mixtures to the engine cylinders.

This condensed liquid is gradually moved along the interior walls of conduits or manifolds by the rush of mixed gasoline and air therethrough, although at a substantially slower rate. Arrival of such condensed liquid at the intake valves of the engine cylinders is undesirable since its combustion there is useless, it leaves harmful residues, and in many respects interferes with successful intake and combustion of properly mixed fuel. In fact, the condition is aggravated for the reason that, of the total amount of liquid deposited on the inner walls of the conduit and moving therealong, the more volatile fractions distill off, leaving lower boiling fractions which, when and if they arrive at the engine cylinders, cause conditions which are even worse than if this fractional distillation did not take place.

The present invention comprehends an internal combustion engine organization wherein the air for the fuel mixture is forcibly delivered to carbureting means, and subsequently to the engine, a part of the heat of compression of such forceful feeding being taken from the air, together with means for correcting the harmful conditions resulting from the condensation of liquid fuel on the walls of the conduits between carburetors and engine cylinders.

Means have heretofore been proposed for attempting to correct the conditions brought about by condensation of liquid fuel in intake manifolds, apart from the general combination outlined in the foregoing paragraph. Prior art attempts have been made to bypass the condensed liquid flowing along the wall of a conduit or manifold and subsequently reinject such bypassed liquid into the fuel stream. Such attempts have been unsatisfactory and impractical and such devices have been of no practical value. For one thing, the rate of flow of the condensed liquid is not sufficient to give any beneficial result and the bypassed liquid fuel merely collects and chokes up in the bypass zone.

The present invention comprehends, as a sub-combination, novel means for recarbureting liquid fuel which has condensed upon the walls of intake manifolds both for use in the novel combination outlined above and for use in connection with internal combustion engines generally. In unsupercharged engines operating temperatures depend largely on the temperature of the surrounding atmosphere but are normally below that of the atmosphere by reason of the heat required to evaporate the volatile liquid fuel.

Referring particularly to the recarbureting element of the present invention, means are provided whereby condensed liquid passes freely along the manifold wall until it encounters an encircling crack or fissure therein. From this crack or fissure a blast of air is directed toward the center of the manifold from all about the encircling crack, whereby liquid fuel arriving at the crack along a manifold wall is impinged against by the air and recarbureted, generally by projection substantially in the direction of the center of the column of gasoline-air mixture moving through the manifold. One of the advantages of this mode of re-mixing resides in the fact that the liquid condensate which is being re-mixed with air is removed from the vicinity of the conduit wall and projected to regions closer to the center of the moving column of mixed fuel.

Where evaporation of liquid fuel takes place outside the cylinder the latent heat of evaporation is taken from the manifold walls and does not affect engine operation. This is the case when dry mixtures of evaporated gasoline pass into the engine cylinders.

With the combination of the present invention, wherein the supercharged air is cooled before carburetion, and wherein the wet mixture is treated to re-diffuse condensed liquid, the fuel mixture entering the cylinders is a mechanical mixture of finely divided liquid suspended in air. Because of this extremely fine mechanical division, the liquid of the mixture evaporates before combustion occurs. Evaporation in this manner and in this phase of the cycle results in quenching of hot spots in the cylinder, including the exhaust valves, and lowers both the initial and terminal temperatures of the expansion phase of the cycle. This results in lower engine operating temperature and permits the use of higher compression pressures.

If a mechanical mixture is employed wherein the fineness of division of the present invention is not provided, evaporation of the liquid in the cylinder is retarded until during the combustion phase of the cycle. Under these circumstances the fuel is burned late and the full expansion ratio is not realized.

While the ensuing description and the accompanying drawing show a specific example of the application of the principles of the present invention, it is to be understood that the spirit and scope of the invention are not limited thereto, or otherwise than as defined in the appended claims.

In the drawing:

Fig. 1 is a schematic lay-out of the fuel distribution system, from the supercharger to an engine cylinder;

Fig. 2 is a fragmentary, longitudinal, cross-sectional view through a portion of an intake manifold showing the novel recarbureting means of the present invention;

Fig. 3 is a fragmentary cross-sectional view similar to Fig. 2 but on an enlarged scale and taken substantially along the line III—III of Fig. 2; and, Fig. 4 is an elevational view of one of the two elements which comprise the recarbureting means of Figs. 2 and 3.

Throughout the several figures of the drawing, like characters of reference denote like parts and the numeral 10 designates generally a supercharger which may be of the centrifugal type and motivated in any desired manner. A conduit leading from the supercharger is designated 11 and terminates in a heat exchange means 12 which may be of the plural confined fluid type, one of the heat exchange fluids being the air from the supercharger 11 which is discharged from the heat exchange means into a conduit 14.

The other of the heat exchange fluids is introduced to the heat exchange means 12 through a conduit 15 and discharged therefrom through a conduit 16. The details of the heat exchange means 12 are conventional and may vary widely and consequently no detailed showing is necessary.

In the schematic showing of Fig. 1 the cooling of the supercharged air is accomplished in conjunction with liquid cooling of the internal combustion engine being served. Taking marine use as one exemplary adaptation of the principles of the present invention, a conduit 18 may comprise a sea-water intake including a suitable pump 19. The conduits 15 and 18 meet in a by-pass valve 20 which may be adjusted for diverting more or less sea water to the heat exchange means 12 by way of conduit 15, the balance being directed to a conduit 21 extending between the by-pass valve and the discharge conduit 16 of the heat exchange means 12.

A heat exchange unit for effecting heat exchange between sea water and the cooling liquid of an internal combustion engine is shown schematically and fragmentarily at 22 in Fig. 1. This unit is likewise obviously of the plural confined fluid type and discharge of sea water therefrom after it has served its purpose by circulation therein may be accomplished in any desired manner. The compressed cooled air issuing from the heat exchanger 12 is conducted to conventional carbureting means indicated at 24.

While the principles of the present invention are not affected thereby, the schematic showing in Fig. 1 is taken from an engine of the V-type having two double carburetors, each serving one half of both banks of cylinders. This merely explains the diagram, wherein the conduit 14 branches both right and left at 26 to serve the two double carburetors, only one being shown in Fig. 1. One barrel of each double carburetor serves half of the cylinders of one bank and in Fig. 1 manifolds 27 are seen extending in opposite directions from the carburetor 24. In the form shown enlargements 28 in each of the manifolds 27, occurring at the point where the path of fuel flow changes direction abruptly, establish zones of turbulence to promote good distribution of the liquid fuel in the air.

In Fig. 1 a single cylinder is indicated schematically at 30, its intake valve being designated 31 and a piston and connecting rod 32 and 33 respectively.

As stated in the preamble hereto, the normal operating temperature in the intake manifold 27, because of the cooling of the intake air by the heat exchange unit 12, is such that liquid fuel tends to condense on the manifold walls and is drawn therealong by the flowing fuel mixture. To recarburet this condensed liquid fuel the present invention provides what may be termed auxiliary or secondary carburetors designated generally 35 in Fig. 1 and shown in detail in Figs. 2, 3 and 4.

As there shown, each device 35 includes a pair of interlocking annular elements 37 and 38 each of which has a frustoconical inner periphery whereby, when in their assembled position in a manifold 27 as shown in Fig. 2, they present a constricted Venturi throat. The direction of fluid flow is indicated by the arrows in Fig. 2.

The outside diameter of the annulus 38 is necked down at its end adjacent the annulus 37 to provide an annular space 40, Fig. 3, the purpose of which will presently appear. In addition, the annulus 38 is provided with an encircling groove 41 which receives latch portions 42 formed on a series of fingers 43 which project from the annulus 37 and are preferably formed integrally therewith and spaced circumferentially thereabout, see Fig. 4. Assembly is effected by merely moving the two annular members toward each other axially, the fingers 43 being spread by camming engagement of their latch portions 42 with the annular member 38 until the latch portions drop into the groove 41.

It will be noted that the fingers 43 and the location of the groove 41 are so proportioned as to leave a fairly narrow but substantial space between the proximate end faces of the annular members 37 and 38, which space constitutes a breach 44 extending entirely about the Venturi throat at its point of greatest constriction. It will be noted that the annular space 40, Fig. 3, likewise extends continuously about the assembly excepting only where it is interrupted by the fingers 43, as in Fig. 2.

Fluid communication between the manifold proper and the annular space 40 at a point before the encircling breach 44 is established by the provision of a plurality of openings 46 which, as appears from Fig. 3, may be round holes having their axes extending obliquely so that their inner edges, as at 47 in Fig. 3, comprise scoops for diverting fluent mixed air and gasoline from the manifold proper into the annular space 40. It will be noted especially that the diverted fluid is taken principally from the main body of air-fuel mixture in the manifold and the amount of liquid fuel condensed on the manifold wall that enters the openings 46 is negligible. By far the greater part of the condensed liquid fuel passes between the openings 46 and continues along the inner periphery of the annulus 38, which forms in effect a continuation of the interior wall of the manifold 27, until such condensed liquid fuel reaches the encircling breach 44.

At the breach 44 the liquid fuel encounters a gaseous blast emerging from the encircling breach and directed radially toward the axis of the manifold 27. This blast of mixed air and gasoline is a product of two influences. One of these is the dynamic force of fluid flow in the manifold which is retained by the diverted gaseous mixture flowing through the openings 46, the annular space 40 and the encircling breach 44. The other influence is the eductive Venturi action resulting from the accelerated flow of fluid through the constricted throat formed by the elements 37 and 38.

The result is an effective recarburetion of all condensed liquid arriving at the breach 44 and, in operation, the recarburetion device here disclosed has proved itself by exhibiting a surprising increase in efficiency and fuel economy, as compared with engines operating under identical conditions but without the device of the present invention.

What is claimed is:

1. In a fuel supply system for an internal combustion engine having a conduit for conveying mixed gas and liquid to the engine, means for remixing liquid condensed on the walls of said conduit, said means comprising an encircling passage opening into said conduit entirely thereabout, the interior wall of said conduit extending substantially continuously to said encircling passage and passage means communicating with said conduit upstream of said encircling passage for diverting gas from said conduit for flow radially through said encircling passage for impingement against liquid fuel flowing toward said encircling passage along the interior walls of said conduit.

2. In a fuel supply system for an internal combustion engine having a conduit for conveying mixed gas and liquid to the engine, means for remixing liquid condensed on the wall of said conduit, said means comprising an annulus forming a Venturi throat in said conduit, the interior wall of said Venturi throat forming a substantial continuation of the interior conduit wall at the inlet side of said throat, an encircling passage opening into said throat, and passage means at the inlet side of said throat for diverting gas from said conduit for flow radially through said encircling passage for impingement against liquid fuel flowing toward said encircling passage along the inner periphery of said annulus.

3. Means for use in an internal combustion engine intake manifold for remixing liquid fuel condensed on the walls thereof, said means comprising an annulus adapted to form a constricted throat in a manifold when disposed therein, a slit extending entirely about said annulus and comprising a fluid passage thereinto, and openings in said annulus at the inlet side of said throat comprising passage means for diverting gas from said conduit for flow radially through said slit for impingement against condensed liquid fuel flowing toward said slit, the axes of said openings extending divergently with respect to the axis of said annulus in the direction of fluid flow whereby to form scoops for insuring diversion of gaseous mixture as distinguished from condensed liquid, the openings being sufficiently small in size and number as not to interfere with flow therepast of the major portion of the liquid condensed on the manifold wall.

4. Means for use in an internal combustion engine intake manifold for remixing liquid fuel condensed on the walls thereof, said means comprising a pair of annular members each having a tapered inner periphery and disposed in assembled position with their least interior diameters toward each other to form a constricted throat in a manifold when disposed therein, assembly means for holding said annular members spaced to form a slit extending entirely about said annulus and comprising a fluid passage thereinto, and passage means for diverting gas from said conduit for flow radially through said slit into said throat for impingement against condensed liquid fuel flowing toward said slit.

5. Means for use in an internal combustion engine intake manifold for remixing liquid fuel condensed on the walls thereof, said means comprising a pair of annular members each having a tapered inner periphery and disposed in assembled position with their least interior diameters toward each other to form a constricted throat in a manifold when disposed therein, assembly means for holding said annular member spaced to form a slit extending entirely about said annulus and comprising a fluid passage thereinto and passage means for diverting gas from said conduit for flow radially through said slit into said throat for impingement against condensed liquid fuel flowing toward said slit, said passage means comprising openings formed in the tapered inner periphery of the annular member at the entry side of said throat.

6. Means for use in an internal combustion engine intake manifold for remixing liquid fuel condensed on the walls thereof, said means comprising a pair of annular members each having a tapered inner periphery and disposed in assembled position with their least interior diameters toward each other to form a constricted throat in a manifold when disposed therein, assembly means for holding said annular members spaced to form a slit extending entirely about said annulus and comprising a fluid passage thereinto, and passage means for diverting gas from said conduit for flow radially through said slit into said throat for impingement against condensed liquid fuel flowing toward said slit, said passage means comprising openings formed in the tapered inner periphery of an annular member at the entry side of said throat, the axes of said openings extending divergently with respect to the axis of said annular members in the direction of fluid flow whereby to form scoops for insuring diversion of gaseous mixture as distinguished from condensed liquid.

7. Means for use in an internal combustion engine intake manifold for remixing liquid fuel condensed on the walls thereof, said means comprising a pair of annular members each having a tapered inner periphery and disposed in assembled position with their least interior diameters toward each other to form a constricted throat in a manifold when disposed therein, assembly means for holding said annular members spaced to form a slit extending entirely about said annulus and comprising a fluid passage thereinto, and passage means for diverting gas from said conduit for flow radially through said slit into said throat for impingement against condensed liquid fuel flowing toward said slit, said passage means comprising openings formed in the tapered inner periphery of an annular member at the entry side of said throat, the axes of said openings extending divergently with respect to the axis of said annular members in the direction of fluid flow whereby to form scoops for insuring diversion of gaseous mixture as distinguished from condensed liquid, the openings being sufficiently small in size and number as not to interfere with flow therepast of the major portion of the liquid condensed on the manifold wall.

8. Means for use in an internal combustion engine intake manifold for remixing liquid fuel condensed on the walls thereof, said means comprising a pair of annular members each having a tapered inner periphery and disposed in assembled position with their least interior diameters toward each other to form a constricted throat in a manifold when disposed therein, assembly means for holding said annular members spaced to form a slit extending entirely about said annulus and comprising a fluid passage thereinto, and passage means for diverting gas from said conduit for flow radially through said slit into said throat for impingement against condensed liquid fuel flowing toward said slit, said passage means comprising openings formed in the tapered inner periphery of the annular member at the entry side of said throat, the openings being sufficiently small in size and number as not to interfere with flow therepast of the major portion of the liquid condensed on the manifold wall.

JOSEPH W. RIDGWAY.